United States Patent

Ko

[19]

[11] Patent Number: 6,046,522
[45] Date of Patent: Apr. 4, 2000

[54] SINGLE DIRECTION SINGLE PHASE SYNCHRONOUS MOTOR

[75] Inventor: Fretrick Siu Kwan Ko, Hong Kong, China

[73] Assignee: Johnson Electric S.A., La Chaux-de-Fonds, Switzerland

[21] Appl. No.: 09/181,813

[22] Filed: Oct. 29, 1998

[30] Foreign Application Priority Data

Oct. 31, 1997 [GB] United Kingdom .................. 9722888

[51] Int. Cl.⁷ .................................................. H02K 49/00
[52] U.S. Cl. ............................ 310/93; 310/77; 310/162; 192/45
[58] Field of Search ............................. 310/162, 93, 77, 310/100; 418/69; 192/45, 41 R, 41 A; 74/7 E

[56] References Cited

U.S. PATENT DOCUMENTS

| | | | |
|---|---|---|---|
| 3,011,606 | 7/1961 | Ferris .................................. | 192/45 |
| 4,499,389 | 2/1985 | Hoche .................................. | 310/41 |
| 4,995,490 | 2/1991 | Kanai .................................. | 192/45 |
| 5,503,541 | 4/1996 | Barito et al. ....................... | 418/69 |
| 5,549,011 | 8/1996 | Shiga et al. ....................... | 74/7 E |
| 5,570,851 | 11/1996 | Yamaguchi et al. ................. | 242/247 |
| 5,740,694 | 4/1998 | Nagao et al. ....................... | 74/7 E |
| 5,746,297 | 5/1998 | Park ................................... | 192/7 |
| 5,819,583 | 10/1998 | Matsushima .......................... | 74/4 |

*Primary Examiner*—Nestor Ramirez
*Assistant Examiner*—Saeed Ghahramani
*Attorney, Agent, or Firm*—Birch, Stewart, Kolasch & Birch, LLP

[57] ABSTRACT

An anti-reverse rotation device suitable for use with a single phase synchronous motor and the like, has a housing with an inner cavity, a rotatable member in the form of a disk and at least one blocking member. The cavity of the housing is bounded by an inner wall forming a cam surface with at least one abrupt change forming a blocking surface. The blocking member is accommodated within a recess formed in the periphery of the disk and moves along the cam surface as the disk rotates. In the forward direction, the cam surface urges the blocking member into the recess. In the reverse direction, the blocking member becomes jammed between the disk and the blocking surface preventing further rotation in the reverse direction.

18 Claims, 3 Drawing Sheets

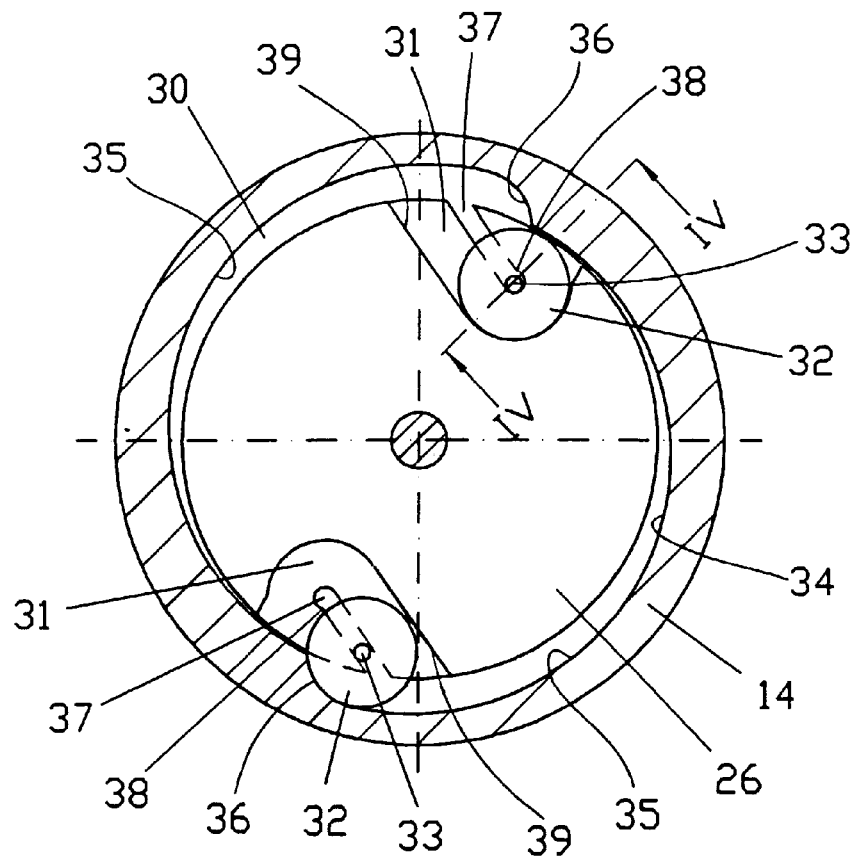
FIG. 3
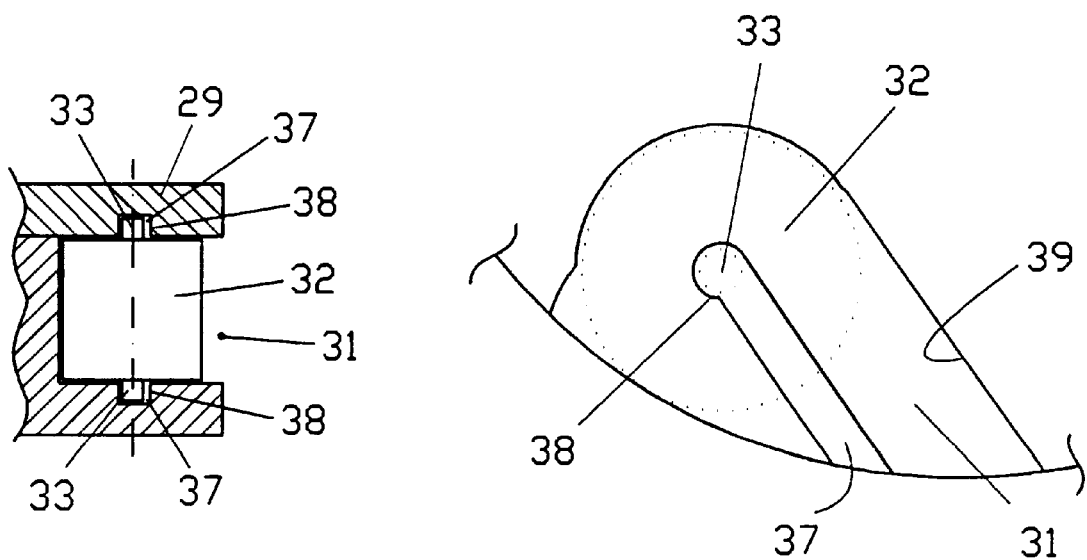
FIG. 4
FIG. 5

SINGLE DIRECTION SINGLE PHASE SYNCHRONOUS MOTOR

FIELD OF THE INVENTION

This invention relates to synchronous motors and in particular, to a device which ensures that a single phase synchronous motor always runs in a single direction.

PRIOR ART

Synchronous motors are well known and are used in many appliances requiring motors with a simple construction but single phase synchronous motors run in either direction, dependent largely on the position of the rotor at the time the motor is turned on. This means that the direction of rotation is unreliable. Shaping of the pole faces of the stator to provide a difference between the static and dynamic magnetic poles has been used to predisposed the motor to a predetermined direction but to work, this requires the motor to be able to rotate freely in the rest position when the motor is turned off. This also reduces slightly the efficiency of the motor by increasing the air gap in certain locations resulting in an uneven air gap and thus, reduced magnetic coupling between the rotor and the stator.

AIM OF THE INVENTION

The present invention aims to provide a single phase synchronous motor which will run in only one direction without modifying the air gap between the stator and rotor. This is achieved by a novel anti-reverse rotation device which can be incorporated into a synchronous motor.

SUMMARY OF THE INVENTION

Accordingly, the present invention provides an anti-reverse rotation device suitable for use with a single phase synchronous motor and the like, the device comprising a housing having an inner cavity, the cavity being radially bounded by an inner wall, a rotatable member located within the cavity and having a through hole for mounting to a shaft of the motor, and at least one blocking member received within a respective recess in the periphery of the rotatable member, wherein the inner wall of the housing forms a cam surface with at least one abrupt change forming a blocking surface, whereby rotation of the rotatable member in a forward direction causes the blocking member to move along the cam surface with the cam surface urging the blocking member into the recess in the rotatable member and rotation in the reverse direction causes the blocking member to become jammed between the rotatable member and the blocking surface preventing further rotation in the reverse direction.

Preferably, the or each recess is radially swept to scoop the blocking member in the forward direction and to expel the blocking member in the reverse direction.

Preferably, the or each blocking member is a roller with an axle which is located in a pair of grooves formed in the respective recess for guiding the roller towards the cam surface.

Preferably, each groove has a detent which retains the roller in a retracted position during forward rotation and releases the roller during reverse rotation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

One embodiment of the invention will now be described by way of example only, with reference to the accompanying drawings in which:

FIG. 3 is an internal view of the anti-reverse rotation device of FIG. 2;

FIG. 4 is a cross-sectional view along line IV—IV of FIG. 3; and

FIG. 5 is a detailed view of a part of the device of FIG. 3.

DETAILED DESCRIPTION OF THE PREFERRED EMBODIMENT

Figure 1:
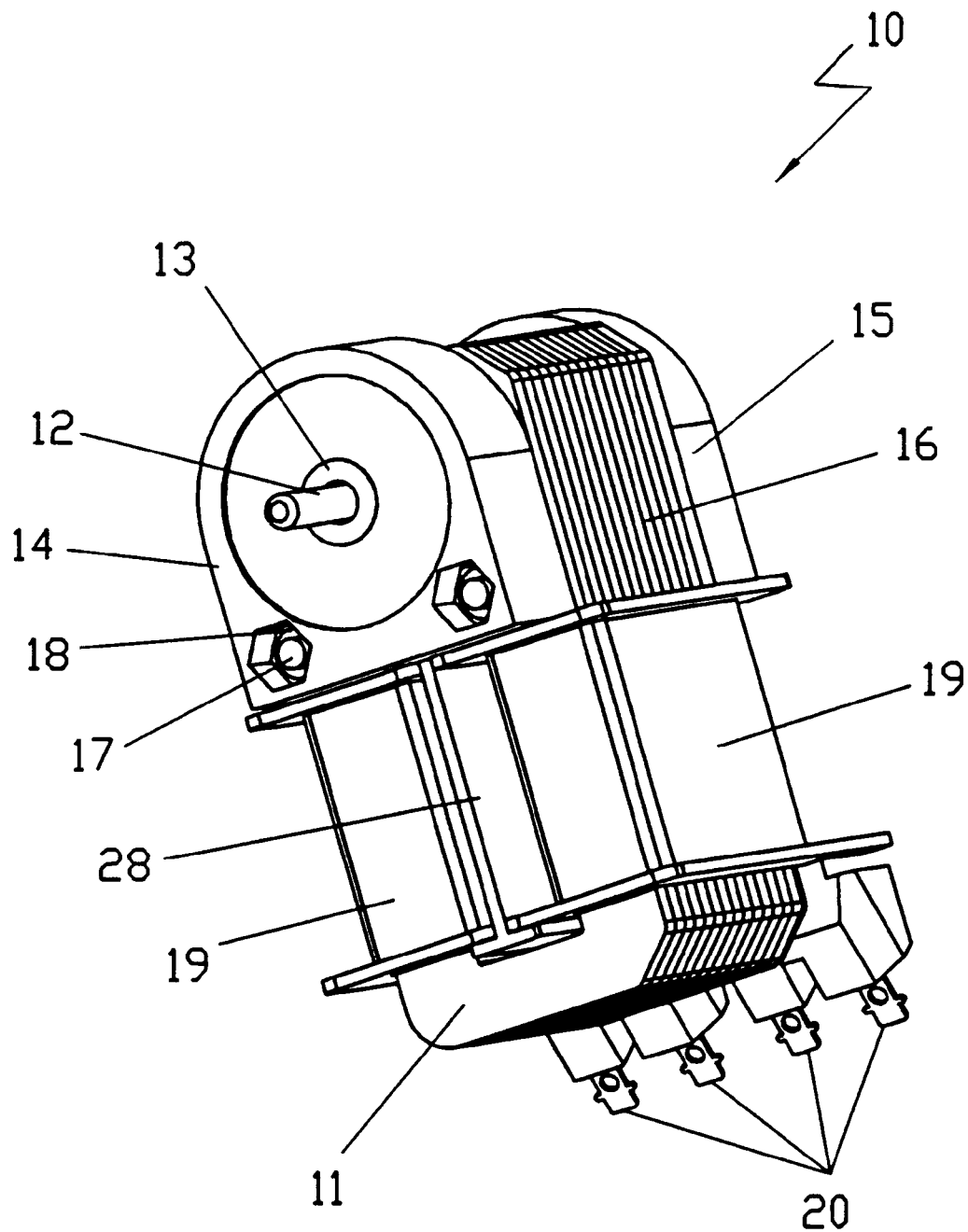
FIG. 1 is a perspective view of a single phase synchronous motor.

FIG. 1 shows a single phase synchronous motor 10 made in accordance with the preferred embodiment of the present invention. Such motors are used in household appliances such as juicers and can openers. Single phase synchronous motors are also used in pumps as used in aquariums, washing machines and dishwashers. Although they do have a slightly different construction, the present invention is equally applicable to those motors.

The motor 10 has a stator 11 and a rotor 12. The rotor is rotatably held in fixed relationship to the stator by bearings 13 supported by end caps or bearing brackets 14, 15. The stator comprises a stack of U-shaped laminations forming a stator core 16 to which the bearing brackets are fastened by means of screws 17 and nuts 18. On each arm of the stator core is fitted a bobbin 19. The bobbins are wound with magnet wire (omitted for clarity) forming the stator coil or stator winding. The magnet wires are terminated on terminals 20 for connection to supply leads or jumper leads.

Figure 2:
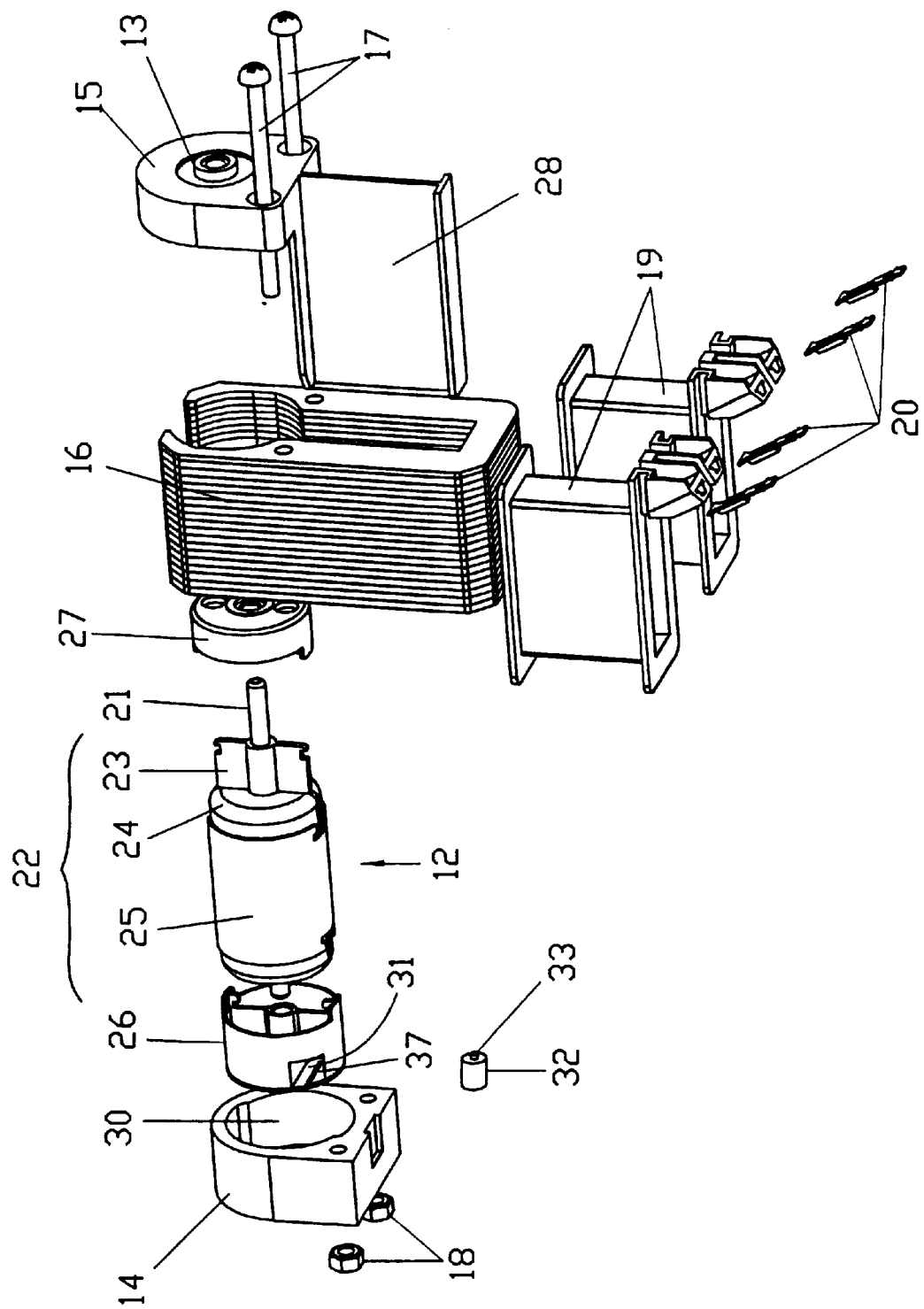
FIG. 2 is a partially exploded elevation of the motor of FIG. 1 showing an anti-reverse rotation device according to a preferred embodiment of the invention.

FIG. 2 depicts the motor of FIG. 1 in an exploded view which shows more clearly the construction of the rotor and bearing brackets. The rotor 12 comprises a motor shaft 21 and a magnet assembly 22 fitted to the shaft. The magnet assembly comprises a magnet holder 23 pressed onto the shaft, magnets 24 and a ring 25 holding the magnets to the magnet holder 23. Front and rear covers 26, 27 cover the axial ends of the magnet assembly and act as spacers between the magnet assembly 22 and the bearing brackets 14, 15. The rear bearing bracket 15 has an integral flange 28 which extends between the bobbins 19 on the stator core to support them on the core. The construction described so far is known.

The front bearing-bracket 14 is thicker than the rear bearing bracket 15 and has an internal cavity 30 which accommodates part of the front cover 26. The front cover 26 has two slots or recesses 31 (only one is shown in FIG. 2) which extend inwardly from the radial surface of the front cover.

The anti-reverse direction device of the present invention comprises a housing with a cavity and a rotatable member located within the cavity. The rotatable member has at least one but preferably two recesses housing or accommodating blocking members or stoppers which interact between a wall of the cavity and the rotatable member. In the embodiment shown, the housing is the front bearing bracket 14. The rotatable member is the front cover 26 and the cavity is cavity 30 formed in the front bearing bracket 14 shown in FIG. 2. Two recesses 31 (only one shown in FIG. 2) form the recesses in the rotatable member and each accommodates a stopper in the form of a roller 32. The rollers may be made of plastic material or hard rubber material. The rollers have axles 33 which may be integral mouldings or pressed axles. The axles located within grooves 37 (only one visible in FIG. 2) for guiding the rollers as will be described in more detail hereinafter. The device works by the interaction of the rollers between the radial wall of the cavity and the rotatable member as will now be described with reference to FIGS. 3, 4 and 5.

Referring firstly to FIG. 3, there is shown a schematic to illustrate salient points of the construction and operation of the anti-reverse direction device. For ease of construction, the front cover 26 is formed in two parts, namely, a body part in which the recesses are formed and a cover part or lid providing a top surface for the recess and having formed therein, one groove of the pair of grooves for each recess. For ease of presentation and clarity, the schematic shows the front cover without the lid which may be attached by any convenient method such as gluing, hot staking or snap fit connections. The housing is shown sectioned to show the configuration of the radial wall of the cavity 30.

The cavity 30 is cylindrical and the surface of the radial or peripheral wall 34 of the cavity is shaped to provide two smooth cam surfaces 35 joined by two points of discontinuity forming abutments or blocking surfaces 36.

As previously mentioned, the blocking members are right cylindrical rollers 32 with short protruding axles 33. The rollers 32 roll along the cam surfaces as the front cover 26 rotates with respect to the front bearing bracket 14, i.e., as the rotor rotates.

In the forward direction, the rollers 32 roll along the cam surfaces 35 with the cam surface gently urging the rollers into their respective recesses 31 in the front cover 26. In the forward direction the rollers drop over the abutments 36. In the reverse direction, as the rotor rotates, the rollers 32 again roll along the cam surfaces 35 but in this case, the cam surfaces allow the rollers to come out of their recesses 31 under the influence of centrifugal force or gravity and when the rollers reach the abutments 36 which are the points of abrupt change between the cam surfaces 35, the rollers stop. At this point the radial wall 39 of the recess 31 contacts the roller and prevents further rotation of the rotor in the reverse direction. As shown, the direction of the radial wall of the recess which contacts the roller at the instant of blocking is skewed to the radial plane to urge the roller out of the recess and into engagement with the abutment. This assists positive blocking by reducing the likelihood of the roller 32 jumping or bouncing over the abutment 36.

The axles 33 of the rollers 22 are located in pairs of guide grooves 37 formed in the axial end faces of the recesses 31. In this embodiment, one groove 37 is formed in each recess 31 in the body of the front cover and the other groove of the pair is formed in the lid 29 of the front cover. The grooves guide the movement of the rollers so that the shape of the cavities is not so critical. However, it should be realized that the use of the grooves 37 and axles 33 on the rollers 32 is only a preferred option. One advantage of the use of the grooves and axles and is that the inner ends of the grooves 37 may be formed with a detent 38 for releasably holding the rollers in a retracted position when the motor is rotating in the forward direction to avoid having the rollers continually roll along the cam surface and producing noise and vibration when the rollers drop over the abutments. The grooves 37 extend from the periphery of the cover radially inwardly in the direction of reverse rotation at an angle to the radial plane so that when the motor rotates in the forward direction, the grooves 37 scoop the rollers 32 and draw them into the recesses 31 as the motor starts, due to the inertia of the rollers, bringing the rollers up to speed as the axles 33 reach the end of the grooves. At this point in time, the centrifugal force urges the rollers radially outwardly causing the rollers to maintain contact with the radially outer side of the grooves. The releasable detent 38 is an enlargement at the end of the groove forming a ledge against radial movement which may be slightly curved or have a lip to more securely hold the axle against radial movement but not so curved or lipped, to prevent circumferential movement of the axle 33 towards the radially inner side of the groove when the motor starts to rotate in the reverse direction. The construction of the detent is described in greater detail hereinafter with reference to FIG. 5. The grooves also reduce the friction between the rollers and the front cover allowing faster deployment of the rollers when the motor tries to start in the reverse direction.

The location of one of the rollers 32 within its recess 31 is more clearly shown in FIG. 4 which is a partial cross-sectional view of a part of the front cover 26 including the lid 29, containing one recess 31 and grooves 37. The cross-section is taken along line IV—IV of FIG. 3. A roller, not sectioned, is shown within the recess.

The preferred construction of the grooves is more clearly illustrated in FIG. 5 which is a detailed view of a part of the front cover 26 without the lid, showing one groove 37 in more detail. Roller 32 is shown in phantom for positional reference. Here, it can be seen that the detent 38 in the groove 37 is in the form of a circumferentially extending portion or enlargement of the radially outer side of the groove at its radially inner end. This circumferentially extending portion may have a lip or it may be slightly swept radially inwardly so as to hold the axle at the end of the groove against radial forces, e.g., centrifugal forces when the motor is operating normally. However, the lip is not so large as to retain the axle from circumferential forces which urge the roller away from the inner end of the groove and into contact with the radially inner side of the groove as occurs when the motor tries to start in the reverse direction. In such an event, the inertia of the rollers maintains the rollers stationary as the cover starts to move in the reverse direction. The lip may deflect the roller slightly inwardly before the axle 33 engages the inner side of the groove at which time the roller is urged radially outwardly and circumferentially in the reverse direction by which time, however, the axle is no longer retained by the detent 38. Thus, by inertia of the roller and by centrifugal force, as the roller starts to rotate with the cover, the roller is expelled from the recess until it engages the cam surface. It rolls along the cam surface until it engages the abutment where it is stopped. Rotation of the rotor also stops as the roller becomes jammed between the abutment and the radial wall 39 of the recess preventing further rotation of the cover and thus, of the motor. The motor then tries to start in the opposite direction as the current through the stator coil changes direction.

As the motor starts to rotate in the forward direction, the grooves scoop up the roller due to the inertia of the roller and draw it into the recess. The cam surfaces co-operate with the grooves to ensure that the rollers are retracted into the recess where they are releasably retained by the detents 38 during normal operation.

As will be readily apparent to those skilled in the art, the invention could be put into practice by a number of embodiments and it is intended to cover all embodiments which fall within the scope of the following claims, in particular and as previously mentioned, the use of rollers with axles and grooves for guiding the rollers into contact with the cam surface is a preferred option. Also, the blocking members may not be right cylindrical rollers. They could, for example, be spherical balls and the abutments need not be shaped to correspond to the shape of the blocking members.

I claim:

1. An anti-reverse rotation device suitable for use with a motor, the device comprising:
    a housing having an inner cavity, the cavity being radially bounded by an inner wall;
    a rotatable member located within the cavity and having a through hole for mounting to a shaft of the motor; and
    a blocking member received within a recess in the periphery of the rotatable member, a detent being provided in the recess, the blocking member being releasably held in the detent during movement of the rotatable member in a forward direction,
    the inner wall of the housing being a cam surface with at least one abrupt change forming a blocking surface, whereby rotation of the rotatable member in the forward direction causes the blocking member to move along the cam surface with the cam surface urging the blocking member into the recess in the rotatable member and rotation in a reverse direction causes the blocking member to become jammed between the rotatable member and the blocking surface preventing further rotation in the reverse direction.

2. The device according to claim 1, wherein the recess is radially swept to scoop the blocking member in the forward direction and to expel the blocking member in the reverse direction.

3. The device according to claim 1, wherein the blocking member is a right cylindrical roller.

4. The device according claim 3, wherein the roller has a rubber surface which contacts the cam surface.

5. The device according to claim 3, wherein the roller has an axle extending from either axial end and the recess in the rotatable member has two grooves in which the axle is located for guiding the roller towards the cam surface.

6. The device according to claim 5, wherein the grooves extend from the periphery of the rotatable member inwardly in a direction radially offset towards the direction of reverse rotation.

7. The device according to claim 1, wherein said detent releasably catches an axle of said blocking member when the motor rotates in the forward direction thereby retaining said blocking member in a retracted position in which said blocking member does not contact the cam surface and releases the axle when the motor rotates in the reverse direction allowing said blocking member to engage the cam surface.

8. The device according to claim 1, wherein there are two blocking members located in respective recesses in the rotatable member.

9. The device according to claim 1, wherein the cam surface has two blocking surfaces.

10. A single phase synchronous motor incorporating an anti-reverse rotation device according to claim 1.

11. The device according to claim 1, wherein said detent releasably holding said blocking member in a retracted position avoids said blocking member from continually abutting the cam surface.

12. The device according to claim 1, wherein said blocking member is held in said detent with centrifugal force during said forward motion.

13. The device according to claim 1, wherein said blocking member held in said detent is impelled from the detent by circumferential force at a time of said reverse direction.

14. An anti-reverse rotation device comprising:
    a housing having an inner cavity;
    a rotatable member located within said inner cavity, the inner cavity having a cam surface and a recess;
    a detent being provided in the recess; and
    a blocking member being received within the recess when the rotatable member moves in a forward direction,
    the blocking member being releasably held in the detent during a forward rotation of the rotatable member, said blocking member being urged radially outward during a reverse rotation of the rotatable member to thereby prevent further rotation in the reverse direction.

15. The anti-reverse rotation device according to claim 14, wherein said anti-reverse rotation device used with a motor.

16. The anti-reverse rotation device according to claim 15, wherein said motor is a single phase synchronous motor.

17. The anti-reverse rotation device according to claim 14, wherein said blocking member is a roller, said roller rolling along said cam surface during said reverse rotation, said cam surface having an abutment to prevent reverse rotation upon contact.

18. The anti-reverse rotation device according to claim 17, wherein said roller has a rubber surface which contacts said cam surface during said reverse rotation.

* * * * *